United States Patent
Blair

(10) Patent No.: US 6,543,659 B2
(45) Date of Patent: Apr. 8, 2003

(54) COLLAPSIBLE CONTAINER FOR A TRUCK BED

(75) Inventor: James Blair, Lake Carroll, IL (US)

(73) Assignee: Saint Technologies, Inc., Shannon, IL (US)

( * ) Notice: Subject to any disclaimer, the term of this patent is extended or adjusted under 35 U.S.C. 154(b) by 26 days.

(21) Appl. No.: 09/848,451

(22) Filed: May 3, 2001

(65) Prior Publication Data

US 2002/0162869 A1 Nov. 7, 2002

(51) Int. Cl.[7] .................................................. B60R 7/00
(52) U.S. Cl. .................. 224/404; 224/498; 296/100.16; 296/100.18; 220/9.2
(58) Field of Search ................................ 224/403, 404, 224/498, 314; 296/39.2, 100.16, 100.18; 220/9.2, 9.3, 9.4; 383/66, 97

(56) References Cited

U.S. PATENT DOCUMENTS

| | | | | |
|---|---|---|---|---|
| 5,096,107 A | * | 3/1992 | VanSon | 224/328 |
| 5,299,704 A | * | 4/1994 | Thorby | 220/6 |
| 5,366,124 A | * | 11/1994 | Dearborn | 224/542 |
| 5,368,210 A | * | 11/1994 | Wotring | 224/404 |
| 5,378,034 A | * | 1/1995 | Nelsen | 296/39.2 |
| 5,868,295 A | * | 2/1999 | Carriere | 224/404 |
| 6,070,775 A | * | 6/2000 | Tolley et al. | 224/404 |
| 6,105,842 A | * | 8/2000 | Cesare | 224/404 |
| 6,349,865 B1 | * | 2/2002 | Tolley et al. | 224/404 |
| 6,401,995 B1 | * | 6/2002 | Yuille et al. | 224/404 |

* cited by examiner

*Primary Examiner*—Stephen K. Cronin
(74) *Attorney, Agent, or Firm*—Wood, Phillips, Katz, Clark & Mortimer

(57) ABSTRACT

A collapsible container for a truck bed includes a weather resistant, flexible envelope. There are two frames engaged with two ends of the envelope, respectively, and two support members connected with each of two side walls of the envelope. The support members are pivotable relative to each other and the frames. The collapsible container may be extended for use as a container with the envelope supported by the frames and the support members to define a substantially box shaped enclosure. The collapsible container may also be folded for storing, with the frames and the support members arranged in a stacked relationship.

20 Claims, 4 Drawing Sheets

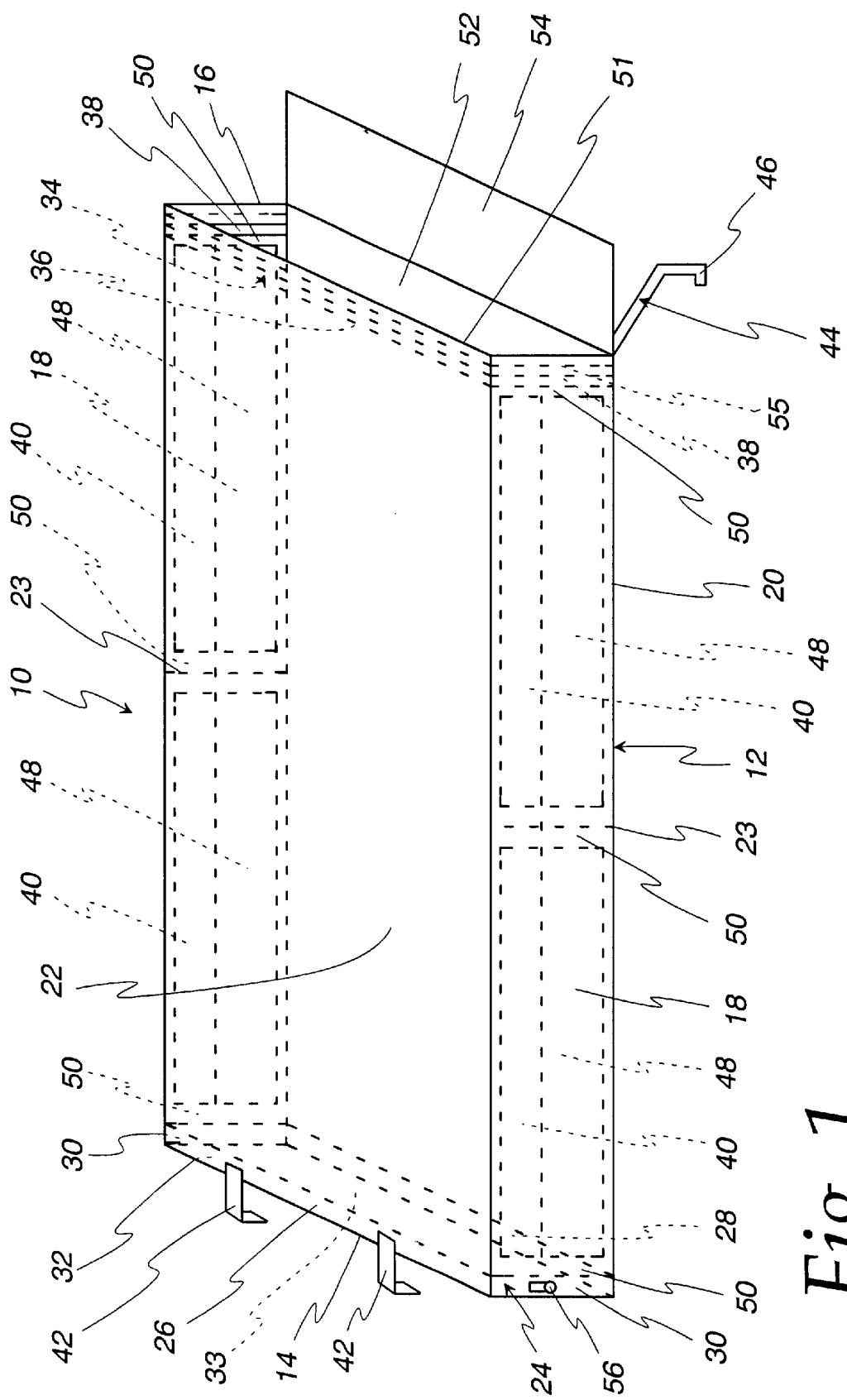

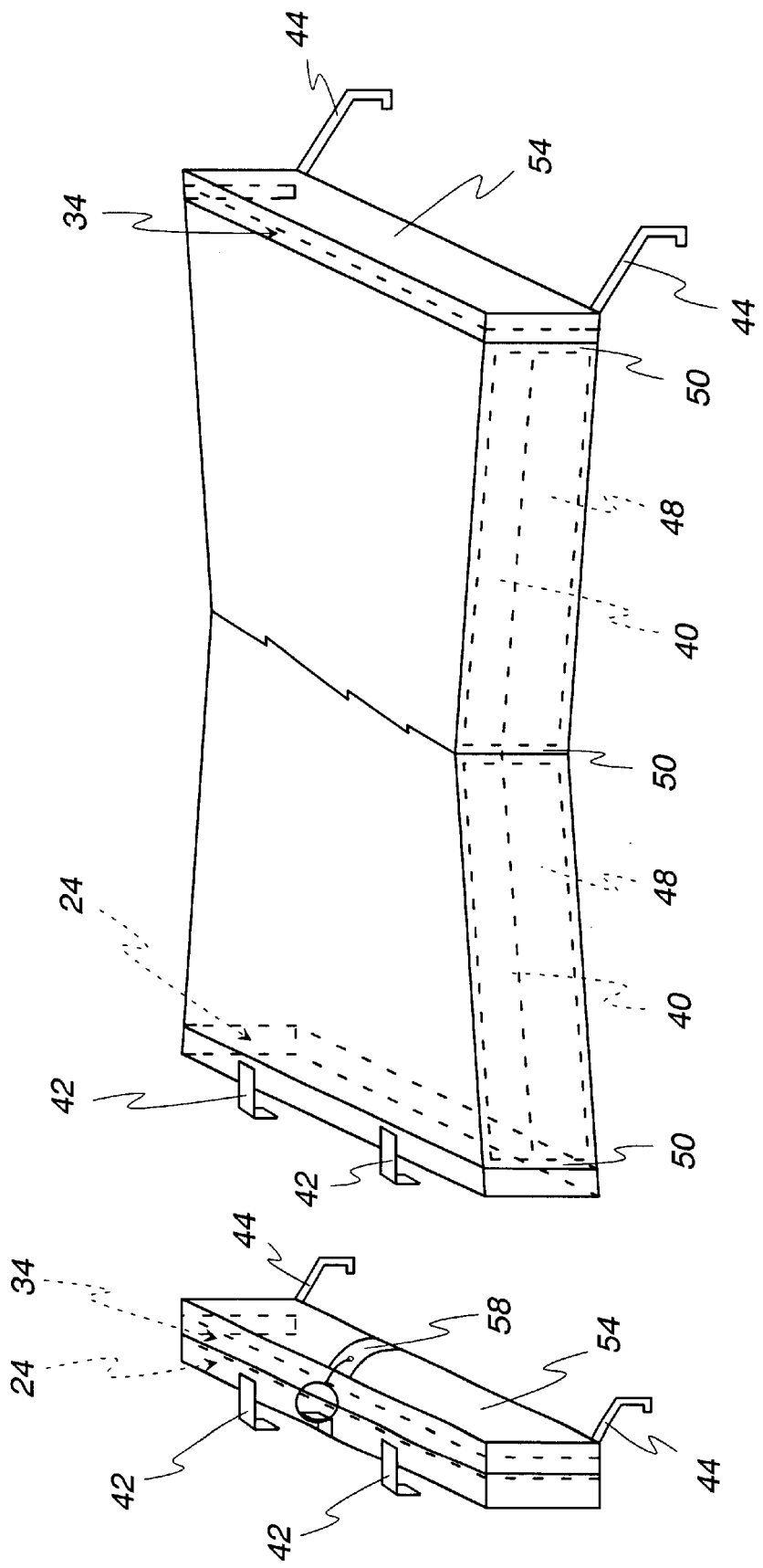

COLLAPSIBLE CONTAINER FOR A TRUCK BED

FIELD OF THE INVENTION

This invention relates to cargo containers for use in pickup truck beds.

BACKGROUND OF THE INVENTION

Bed liners that protect the bed of a pickup truck from being damaged by cargo carried in the bed are known. However, such liners leave the cargo exposed to the elements and to easy access for theft. Pickup bed covers, such as hard and soft tonneau covers and hard-shell caps, are also known. Such covers can protect cargo from direct exposure to the elements and decrease accessability to the cargo for theft. However, such covers do not typically protect the bed of a pickup truck from damage by the cargo, and must be removed and stored when the height of the cargo exceeds the height of the cover from the floor of the bed. For many covers, such as hard-shell caps, removal and storage can be time consuming and otherwise inconvenient.

SUMMARY OF THE INVENTION

In accordance with the invention, a weather resistant, collapsible container is provided for a truck bed. In one embodiment, the collapsible container includes a weather resistant, flexible envelope, a first frame, a second frame, a first support member, a second support member, a third support member and a fourth support member.

The envelope has a collapsed state wherein the container is in a stored position and an extended state wherein the container defines a substantially box shaped enclosure. The envelope includes a first end, a second end, a first side wall extending from the first end to the second end, a second side wall extending from the first end to the second end opposite the first side wall, and a bottom wall extending from the first side wall to the second side wall and bordered by the first and second ends. Each of the first and second side walls has a midpoint located at approximately half the distance between the first and second ends with the envelope in the extended state.

The first frame is engaged with the first end to maintain the first end in a predetermined shape in both the collapsed state and the extended state. The second frame is engaged with the second end to maintain the second end in a predetermined shape in both the collapsed state and the extended state.

The first support member is connected with a length of the first side wall extending from the first end toward the midpoint of the first side wall. The first support member extends less than half the distance between the first and second ends with envelope in the extended state. The first support member is pivotable relative to the first frame. The second support member is connected with a length of the first side wall extending from the second end toward the midpoint of the first side wall. The second support member extends less than half the distance between the first and second ends with envelope in the extended state. The second support member is pivotable relative to the first support member and the second frame. The third support member is connected with a length of the second side wall extending from the first end toward the midpoint of the second side wall. The third support member extends less than half the distance between the first and second ends with envelope in the extended state. The third support member is pivotable relative to the first frame. The fourth support member is connected with a length of the second side wall extending from the second end toward the midpoint of the second side wall. The fourth support member extends less than half the distance between the first and second ends with envelope in the extended state. The fourth support member is pivotable relative to the third support member and the second frame.

In the extended state the envelope is supported by the first and second frames and the first, second, third and fourth support members to define the substantially box shaped enclosure, and in the collapsed state the envelope is folded, with the first frame, the first, second, third and fourth support members, and the second frame arranged in a stacked relationship.

Preferably, at least one first fastener is engaged with the first frame to fix the collapsible container to the truck bed. In one embodiment, at least one second fastener is engaged with the second end of the envelope and connectable with the truck bed to maintain the envelope in the extended state.

In one embodiment, the collapsible container further includes a first pocket, a second pocket, a third pocket and a fourth pocket. The first pocket is connected with the length of the first side wall extending from the first end toward the midpoint of the first side wall. The first pocket receives the first support member to connect the first support member to the first side wall. The second pocket is connected with the length of the first side wall extending from the second end toward the midpoint of the first side wall. The second pocket receives the second support member to connect the second support member to the first side wall. The third pocket is connected with the length of the second side wall extending from the first end toward the midpoint of the second side wall. The third pocket receives the third support member to connect the third support member to the second side wall. The fourth pocket is connected with the length of the second side wall extending from the second end toward the midpoint of the second side wall. The fourth pocket receives the fourth support member to connect the fourth support member to the second side wall.

In one embodiment, the envelope of the collapsible container further includes an upper wall, opposite to the bottom wall, extending from the first side wall to the second side wall and bordered by the first and second ends.

In one embodiment, the upper wall has a first position wherein the height of the envelope is above the height of the truck bed, and a second position wherein the height of the envelope is approximately equal to the height of the truck bed. The container further includes at least one pole connected to the upper wall of the envelope to maintain the upper wall in the first position.

In one embodiment, a collapsible container for a truck bed includes a weather resistant, flexible envelope, a first frame, a second frame, at least one first support member, and at least one second support member. The envelope has a collapsed state wherein the container is in a stored position and an extended state wherein the container defines a substantially box shaped enclosure. The envelope includes a first end, a second end, a first side wall extending from the first end to the second end, a second side wall extending from the first end to the second end opposite the first side wall, and a bottom wall extending from the first side wall to the second side wall and bordered by the first and second ends. The first frame is engaged with the first end to maintain the first end in a predetermined shape in both the collapsed state and the extended state. The second frame is engaged with the second end to maintain the second end in a predetermined shape in both the collapsed state and the extended state. The first support member is connected with a length of the first side wall that is less than half the distance between the first and second ends with envelope in the extended state. The first support member is pivotable relative to the first and second frames. The second support member is connected with a length of the second side wall that is less than half the distance between the first and second ends with envelope in the extended state. The second support member is pivotable relative to the first and second frames. In the extended state the envelope is supported by the first and second frames and the first and second support members to define the substantially box shaped enclosure, and in the collapsed state the envelope is folded with the first frame, the first and the second support members, and the second frame arranged in a stacked relationship.

In one embodiment, the collapsible container further includes a first pocket and a second pocket. The first pocket is connected with the length of the first side wall. The first pocket receives the first support member to connect the first support member to the first side wall. The second pocket is connected with the length of the second side wall. The second pocket receives the second support member to connect the second support member to the second side wall.

DESCRIPTION OF THE DRAWINGS

FIG. 1 is a perspective view of a collapsible container for a truck bed with the container in an extended state in accordance with one embodiment of the invention;

FIG. 2 is a perspective view of the collapsible container of FIG. 1 with the container in the transition between the extended state and a collapsed state;

FIG. 3 is a perspective view of the collapsible container of FIG. 1 with the container in the collapsed state;

DESCRIPTION OF THE PREFERRED EMBODIMENTS

Figure 4:
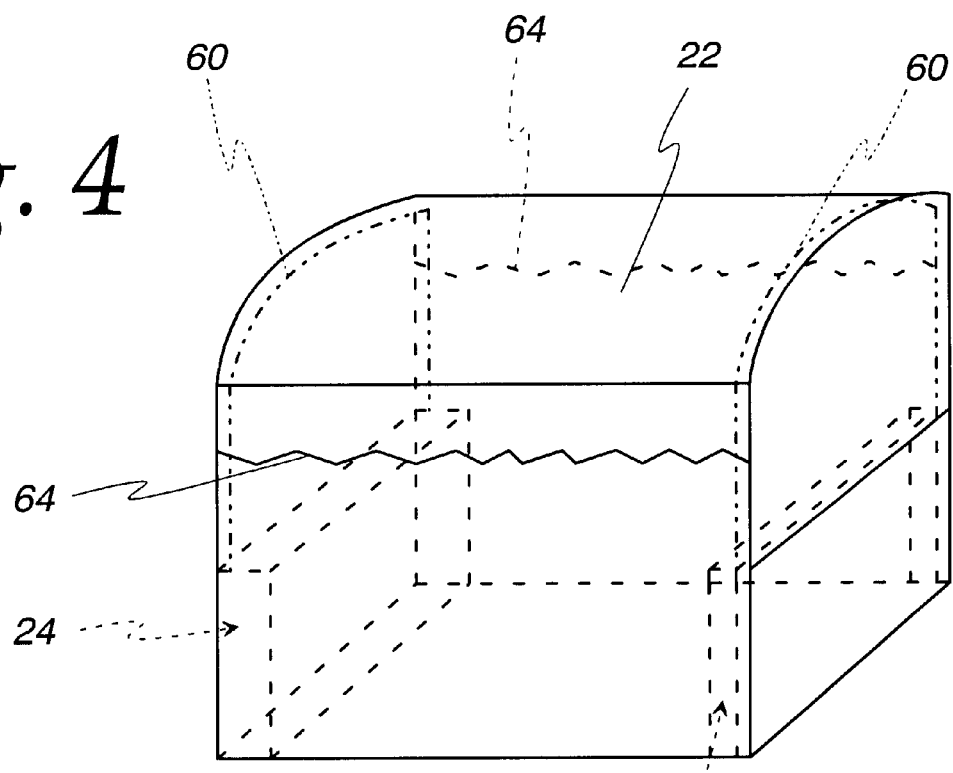
FIG. 4 is a perspective view of a collapsible container for a truck bed with an upper wall of the container in a first position in accordance with one embodiment of the invention.

FIGS. 1–3 represent one embodiment of a collapsible container 10 for a truck bed (not shown). The container 10 includes a weather resistant, flexible envelope 12 having an extended state wherein the container 10 defines a substantially box shaped enclosure as shown in FIG. 1, and a collapsed state wherein the container 10 is in a stored position as shown in FIG. 3. Preferably, the envelope 12 is made from a fabric with plastic coating and is waterproof.

Referring to FIG. 1, the envelope 12 includes a first end 14, a second end 16, two side walls 18, a bottom wall 20 and an upper wall 22. The side walls 18 are spaced opposite to each other, and extend from the first end 14 to the second end 16. Each of the side walls 18 has a midpoint 23 located at approximately half the distance between the first and second ends 14, 16 with the envelope 12 in the extended state. The bottom and upper walls 20, 22 are spaced opposite to each other, extend between the two side walls 18 and are bordered by the first and second ends 14, 16. Preferably, the first and second ends 14, 16, the side walls 18, and the bottom and upper walls 20, 22 are substantially rectangular shaped walls with the envelope 12 in the extended state.

Referring to FIGS. 1–3, a frame 24 is engaged with the first end 14 of the envelope 12, and is preferable located inside of the envelope 12. The frame 24 is made of rigid material such as metal, plastic or wood that is capable of maintaining the first end 14 in a predetermined shape, preferably rectangular, in both the collapsed state and the extended state. The frame 24 includes a horizontal upper wall 26, a horizontal bottom wall 28 parallel and opposite to the upper wall 26, two vertical side walls 30 extending from the upper wall 26 to the bottom wall 28 parallel and opposite to each other, and a vertical end wall 32, which together define an approximately rectangular receptacle 33. Preferably, the walls 32, 26, 28, 30 are connected with the first end 14, and the upper, bottom and side walls 22, 20, 18 of the envelope 12 respectively.

A U-shaped frame 34 is engaged with the second end 16 of the envelope 12 and is preferable located inside of the envelope 12. The U-shaped frame 34 is made of rigid material such as metal, plastic or wood that is capable of maintaining the second end 16 in a predetermined shape, preferably rectangular, in both the collapsed state and the extended state. The U-shaped frame 34 has a horizontal upper member 36 connected to the upper wall 22 of the envelope 12, and two legs 38 extending from the upper member 36. Each of the legs 38 is connected to one of the side walls 18 of the envelope 12.

Referring to FIG. 1, the container 10 includes four support members 40, with two of the support members 40 connected to one side wall 18 of the envelope 12 and the other two support members 40 connected with the other side wall 18. More specifically, each of the support members 40 is engaged with a length of one of the side walls 18 extending from one of the ends 14, 16 toward the midpoint 23 of the side wall 18. Preferably, the support members 40 extend slightly less than half the distance between the first and second ends 14, 16 with envelope 12 in the extended state. The height of support members 40 is approximate to the height of the side walls 18 with the envelope 12 in the extended state. Each of the support members 40 is pivotable relative to its adjacent support member 40 and frame 24 or 34. Each of the support members 40 is made of a frame or solid panel of rigid material such as metal, plastic or wood that is capable of supporting the side walls 18 in a predetermined shape, preferably rectangular, in the extended state. In one embodiment, the support members 40 are rectangular panels.

In the extended state shown in FIG. 1, the envelope 12 is supported by the frame 24, the support members 40 and the U-shaped frame 34 to define the substantially box shaped enclosure. In the collapsed state shown in FIG. 3, the envelope 12 is folded, with the frame 24, two of the support members 40 connected with one of the side walls 18, the other two support members 40 connected with the other side wall 18, and the U-shaped frame 34 arranged successively in a stacked relationship. Preferably, with envelope 12 in the collapsible state, two of the support members 40 connected with one of the side walls 18 together with the length of the envelope 12 connected thereto are contained within the receptacle 33 of the frame 24, while the other two support members 40 connected with the other side wall 18 together with the length of the envelope 12 connected thereto are contained within the frame 34.

Referring to FIGS. 1–3, two fasteners 42 are engaged with the frame 24 to fix the collapsible container 10 to a truck bed. In the illustrated embodiment, the fasteners 42 are mounted on the upper wall 26 of the frame 24 and spaced away from each other at a selected distance. Each of the fasteners 42 is a bracket including an L-shaped member connectable to a front end or wall of a truck bed. One skilled in the art would recognize that other forms of fasteners may be used to fasten the container 10 to the truck bed.

There are two other fasteners 44 engaged with the second end 16 of the envelope 12 and connectable with the truck bed to maintain the envelope 12 in the extended state. In the illustrated embodiment, each of the fasteners 44 is an adjustable strap with one end connected to a respective lower corner of the second end 16 or the frame 34 and another end engaged with a hook 46 connectable to a back end of the truck bed. When the straps are tightened, they place the envelope 12 in tension between the straps and the fasteners 42, thereby maintaining the envelope in the extended state. One skilled in the art would recognize that other forms of fasteners may be used that are connectable with the truck bed and adapted to maintain the envelope 12 in the extended state.

Referring to FIG. 1, each of the side walls 18 of the envelope 12 is provided with two pockets 48. Each of the pockets 48 is connected with one of the side walls 18 to receive one of the support members 40 to engage the support member 40 with the side wall 18. Preferably, each of the pockets 48 is rectangular in shape with three sides connected to the corresponding side wall 18 and a fourth side open to receive a respective one of the support members 40 to connect it to the corresponding side wall 18. The space between each of the pockets 48 and the corresponding side wall 18 is made to snugly receive the respective support member 40. In the illustrated embodiment, the height of each of the pockets 48 is lower than the height of the corresponding side wall 18 with the envelope 12 in the extended state, and the upper sides of the pockets 48 are open to receive the support members 40. Preferably, the pockets 48 are formed by the same flexible material as the envelope 12.

The collapsible container 10 further includes six hinges 50, each of the hinges 50 located between the adjacent support members 40, or between one support member 40 and its adjacent frame 24 or 34. In the illustrated embodiment, the hinges 50 are formed by the flexible material of the side walls 18 extending between the respective frames 24, 34 and support members 40. It may be advantages in some applications to employ other types of hinges, such as for example a standard door hinge, a piano hinge, or a so called "living hinge".

The second end 16 of the envelope 12 has an outer perimeter 51 defining an opening 52 that allows access to the interior of the envelope 12. There is a rectangular flap 54 having one side pivotably connected with a lower side of the second end 16. The flap 54 is preferably made of ridged material. The flap 54 is adapt to pivot between an open position shown in FIG. 1 and a closed position wherein the flap is engaged with the outer perimeter 51 of the second end 16 to close the opening 52. In one embodiment, the flap 54 is covered by an extension of the flexible material of the bottom wall 20 of the envelope 12, with the flexible material between the flap 54 and the second end 16 serving as a hinge.

An elastic band, shown by the dashed line 55, is connected with the outer perimeter 51 of the second end 16 of the envelope 12 to retain the flap 54 in the closed position while allowing a user to selectively enlarge the outer perimeter 51 of the second end 16 to move the flap 54 between the open and closed positions. Preferably, the elastic band 55 is contained in a pocket extending around the perimeter 51 similar to that employed with drawstrings in clothing or bags.

As seen in FIG. 3, the container 10 preferably includes a releasable strap 58 to hold the container 10 in the collapsed state.

Figure 5:
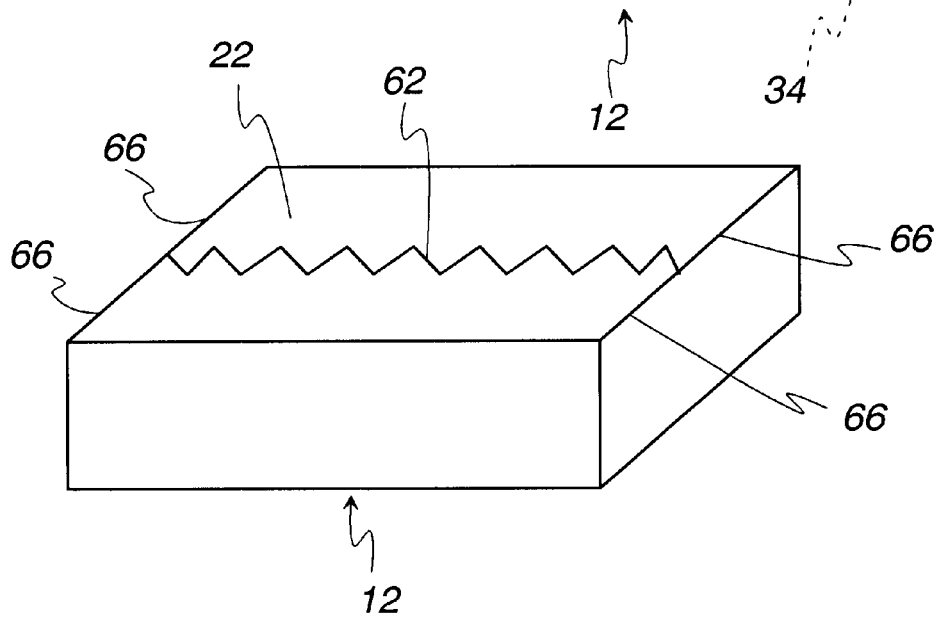
FIG. 5 is a perspective view of the collapsible container of FIG. 4 with the upper wall in a second position.

FIGS. 4 and 5 show one embodiment of the container 10 in which the upper wall 22 of the envelope 12 has a first position and a second position. In the first position as depicted in FIG. 4, the height of the envelope 12 is extended above the height of the truck bed. In the second position as depicted in FIG. 5, the height of the container 10 is approximately equal to the height of the tuck bed. Referring to FIG. 4, a plurality of fiberglass poles 60 are engaged with the upper wall 22 on the inside of the envelop 12 to maintain the upper wall 22 in the first position. The poles 60 preferably have ends that engage in respective receptacles formed in the frames 24, 34. It should be appreciated that the number, and configuration of the poles 60 will be dependent upon the desired shape of the upper wall 22 in the first position, and that the pole constructions, materials, and configurations can be borrowed from the many known in the tent art. A zipper 62 having two sets of mating teeth 64 is connected with the upper wall 22. The zipper 62 has an open state and a closed state. In the open state, the two sets of mating teeth 64 are spaced from each other with the upper wall 22 in the first position as shown in FIG. 4. In the closed state, the two sets of mating teeth 64 are engaged to retain the upper wall 22 in the second position as shown in FIG. 5. In some embodiments, it may be desirable to provide some form of closures at the interfaces 66 between the upper wall 22 and the first and second ends 14, 16 to prevent or discourage wind and/or water from gathering in the folds of the envelope 12 that are formed with the upper wall 22 in the second position shown in FIG. 5. The other aspects of the container 10 shown in FIGS. 4 and 5 are identical to those described in connection with FIGS. 1–3.

Preferably, the collapsible container 10 is approximate 8 feet long and 4 feet wide with the envelope 12 in the extended state, which is suitable for a standard pickup truck bed and can substantially fill the space bordered by the front end, tail gate, and wheel wells of the standard pickup truck bed.

Optionally, one or more ring(s) 56 may be mounted on the side walls 18 of envelope 12 proximate to the first or second ends 14 or 16. Each ring 56 can be used as connection point or tie down to aid in retaining cargo in the space between the container 10 and an associated side wall of the truck bed.

Figure 6:
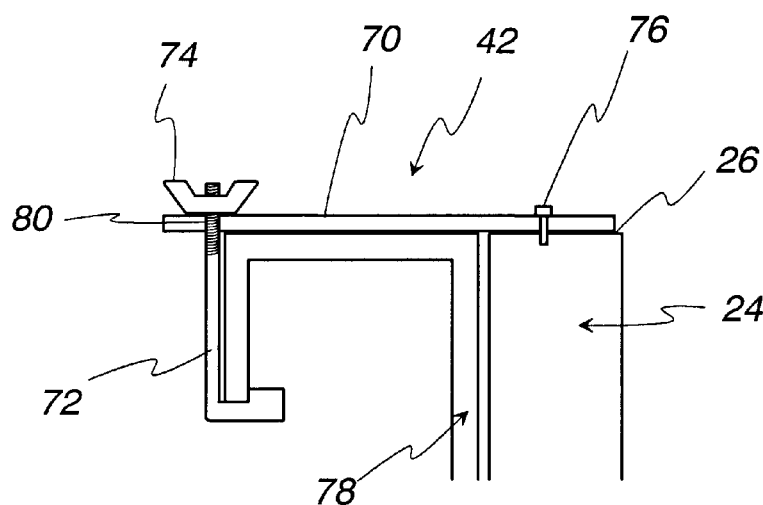
FIGS. 6, 7 and 8 show three alternate embodiments of a fastener for the collapsible containers shown in FIGS. 1–5.

FIG. 6 shows an alternate embodiment for the fastener 42 wherein the fastener 42 includes a plate 70, a J-shaped threaded bolt 72, and a wing nut 74. The bolt 72 is received in a hole 80 that extends through the plate 70. The plate 70 is attached to the upper wall 26 of the frame 24 by a fastener 76, such as a screw. The bolt 72 engages a lip on a front end 78 of a truck bed. The wing nut 74 clamps the lip of the truck bed between the bolt 72 and the plate 70 by tightening on the threads of the bolt 72.

Figure 7:
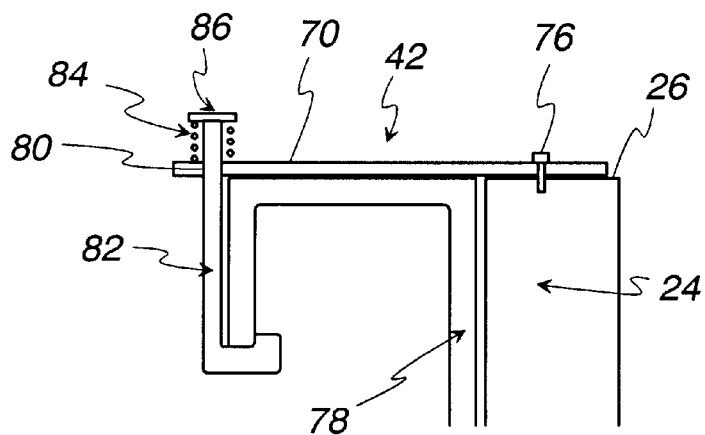

FIG. 7 shows another embodiment of the fastener 42 similar to the embodiment shown in FIG. 6, except that the J-shaped bolt 72 has been replaced with a J-shaped rod 82 and the wing nut 74 has been replaced by a helical spring 84 that engages a spring stop 86 fixed to the rod 82. The spring 84 clamps the lip of the truck bed between the J-shaped bolt 82 and the plate 70.

Figure 8:
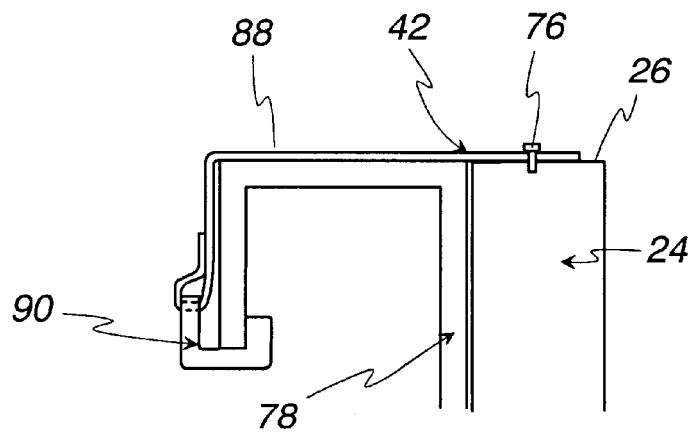

FIG. 8 shows yet another embodiment of the fastener 42 wherein the fastener 42 includes a strap 88, such as a nylon strap, and a U-shaped plate 90 that is attached to the strap. The strap 88 is fixed to the upper wall 26 of the frame 24 by a fastener 76 and the U-shaped plate 90 hooks onto the lip of the front end 78 of the truck bed.

The fastener 42 could also be provided in the form of one or more bungee or elastic cords, each having one of its hooked ends engaged with the lip of the truck bed and the other hooked end of the bungee cord engaged with eyelets, or other similar features, provided in the container 10.

From the foregoing, it will be appreciated that the collapsible container 10 can protect cargo during all kinds of weather conditions such as rain, snow and so on. Further, it should also appreciated that the collapsible container 10 can be stored in a truck bed and occupy relatively little space with the container 10 in the collapsible state, and preferably, the fasteners 42 fixed to the front end of the truck bed. This is advantageous when it is desired to haul cargo that is too large for the container 10. In addition, the truck bed can be protected and kept clean when the collapsible container 10 is used to carry cargo.

Finally, it should be appreciated that the container 10 can be made relatively light in weight in comparison to hardshell caps, and thus can be easily installed and removed.

Having expressly identified a number of potential advantages offered by the container 10, it should be understood that some embodiments of the invention may not exhibit all of the expressly identified advantages, or may exhibit other advantages not expressly identified.

I claim:

1. A collapsible container for a truck bed, the collapsible container comprising:
   a weather resistant, flexible envelope having a collapsed state wherein the container is in a stored position and an extended state wherein the container defines a substantially box shaped enclosure, the envelope comprising a first end, a second end, a first side wall extending from the first end to the second end, a second side wall extending from the first end to the second end opposite the first side wall, each of the first and second side walls having a midpoint located at approximately half the distance between the first and second ends with the envelope in the extended state, and a bottom wall extending from the first side wall to the second side wall and bordered by the first and second ends;
   a first frame engaged with the first end to maintain the first end in a predetermined shape in both the collapsed state and the extended state;
   a second frame engaged with the second end to maintain the second end in a predetermined shape in both the collapsed state and the extended state;
   a first support member connected with a length of the first side wall extending from the first end toward the midpoint of the first side wall, the first support member extending less than half the distance between the first and second ends with envelope in the extended state, the first support member being pivotable relative to the first frame;
   a second support member connected with a length of the first side wall extending from the second end toward the midpoint of the first side wall, the second support member extending less than half the distance between the first and second ends with envelope in the extended state, the second support member being pivotable relative to the first support member and the second frame;
   a third support member connected with a length of the second side wall extending from the first end toward the midpoint of the second side wall, the third support member extending less than half the distance between the first and second ends with envelope in the extended state, the third support member being pivotable relative to the first frame; and
   a fourth support member connected with a length of the second side wall extending from the second end toward the midpoint of the second side wall, the fourth support member extending less than half the distance between the first and second ends with envelope in the extended state, the fourth support member being pivotable relative to the third support member and the second frame;
   wherein in the extended state the envelope is supported by the first and second frames and the first, second, third and fourth support members to define the substantially box shaped enclosure, and in the collapsed state the envelope is folded with the first frame, the first, second, third and fourth support members, and the second frame arranged in a stacked relationship.

2. The collapsible container of claim 1 further comprising:
   a first pocket connected with the length of the first side wall extending from the first end toward the midpoint of the first side wall, the first pocket receiving the first support member to connect the first support member to the first side wall;
   a second pocket connected with the length of the first side wall extending from the second end toward the midpoint of the first side wall, the second pocket receiving the second support member to connect the second support member to the first side wall;
   a third pocket connected with the length of the second side wall extending from the first end toward the midpoint of the second side wall, the third pocket receiving the third support member to connect the third support member to the second side wall; and
   a fourth pocket connected with the length of the second side wall extending from the second end toward the midpoint of the second side wall, the fourth pocket receiving the fourth support member to connect the fourth support member to the second side wall.

3. The collapsible container of claim 1 further comprising at least one first fastener engaged with the first frame to fix the collapsible container to the truck bed.

4. The collapsible container of claim 3 further comprising at least one second fastener engaged with the second end of the envelope and connectable with the truck bed to maintain the envelope in the extended state.

5. The collapsible container of claim 1 further comprising:
   a first hinge located between the first frame and the first support member;
   a second hinge located between the first and second support members;
   a third hinge located between the second support member and the second frame;
   a fourth hinge located between the first frame and the third support member;
   a fifth hinge located between the third and fourth support members; and
   a sixth hinge located between the fourth support member and the second frame.

6. The collapsible container of claim 5 wherein the hinges are formed by the flexible material of the envelope, extending between the respective frames and support members.

7. The collapsible container of claim 1 wherein the envelope further comprises an upper wall, opposite to the bottom wall, extending from the first side wall to the second side wall and bordered by the first and second ends.

8. The collapsible container of claim 7 wherein the first frame comprises a receptacle, and at least one of the first, second, third and fourth support members together with the length of the envelope connected thereto are contained within the receptacle with the envelope in the collapsed state.

9. The collapsible container of claim 7 wherein the second frame is a U-shaped frame with an upper member of the U-shaped frame connected to the upper wall, and each leg of the U-shaped frame connected to a respective one of the side walls.

10. The collapsible container of claim 7
wherein the second end of the envelope comprises an outer perimeter defining an opening that allows access to the interior of the enclosure; and
further comprising a flap pivotably connected with the second end to pivot between an open position that allows access to the interior of the enclosure and a closed position wherein the flap is engaged with the outer perimeter of the second end to close the opening.

11. The collapsible container of claim 10 further comprising an elastic band connected with the outer perimeter of the second end of the envelope to retain the flap in the closed position while allowing a user to selectively enlarge the outer perimeter to move the flap between the open and closed positions.

12. The collapsible container of claim 7
wherein the upper wall has a first position wherein the height of the envelope is above the height of the truck bed, and a second position wherein the height of the envelope is approximately equal to the height of the tuck bed; and
further comprising at least one pole connected with the upper wall of the envelope to maintain the upper wall in the first position.

13. The collapsible container of claim 12 further comprising a zipper having two sets of mating teeth connected with the upper wall, the zipper having an open state wherein the two sets of mating teeth are spaced from each other with the upper wall in the first position, and a closed state wherein the two sets of mating teeth are engaged to retain the upper wall in the second position.

14. A collapsible container for a truck bed, the collapsible container comprising:
a weather resistant, flexible envelope having a collapsed state wherein the container is in a stored position and an extended state wherein the container defines a substantially box shaped enclosure, the envelope comprising a first end, a second end, a first side wall extending from the first end to the second end, a second side wall extending from the first end to the second end opposite the first side wall, and a bottom wall extending from the first side wall to the second side wall and bordered by the first and second ends;
a first frame engaged with the first end to maintain the first end in a predetermined shape in both the collapsed state and the extended state;
a second frame engaged with the second end to maintain the second end in a predetermined shape in both the collapsed state and the extended state;
at least one first support member connected with a length of the first side wall that is less than half the distance between the first and second ends with envelope in the extended state, the first support member being pivotable relative to the first and second frames; and
at least one second support member connected with a length of the second side wall that is less than half the distance between the first and second ends with envelope in the extended state, the second support member being pivotable relative to the first and second frames;
wherein in the extended state the envelope is supported by the first and second frames and the first and second support members to define the substantially box shaped enclosure, and in the collapsed state the envelope is folded with the first frame, the first and the second support members, and the second frame arranged in a stacked relationship.

15. The collapsible container of claim 14 further comprising
a first pocket connected with the length of the first side wall, the first pocket receiving the first support member to connect the first support member to the first side wall; and
a second pocket connected with the length of the second side wall, the second pocket receiving the second support member to connect the second support member to the second side wall.

16. The collapsible container of claim 14 wherein the envelope further comprises an upper wall, opposite to the bottom wall, extending from the first side wall to the second side wall and bordered by the first and second ends.

17. The collapsible container of claim 14
wherein the second end of the envelope comprises an outer perimeter defining an opening that allows access to the interior of the enclosure; and
further comprising a flap pivotably connected with the second end to pivot between an open position that allows access to the interior of the enclosure and a closed position wherein the flap is engaged with the outer perimeter of the second end to close the opening.

18. The collapsible container of claim 14 further comprising at least one first fastener engaged with the first frame to fix the collapsible container to the truck bed.

19. The collapsible container of claim 18 further comprising at least one second fastener engaged with the second end of the envelope and connectable with the truck bed to maintain the envelope in the extended state.

20. A collapsible container for a truck bed, the collapsible container comprising:
a weather resistant, flexible envelope having a collapsed state wherein the container is in a stored position and an extended state wherein the container defines a substantially box shaped enclosure, the envelope comprising a first end, a second end, the second end having an outer perimeter to define an opening that allows access to the interior of the enclosure, a first side wall extending from the first end to the second end, a second side wall extending from the first end to the second end opposite the first side wall, each of the first and second side walls having a midpoint located at approximately half the distance between the first and second ends with the envelope in the extended state, a bottom wall extending from the first side wall to the second side wall and bordered by the first and second ends, and an upper wall, opposite to the bottom wall, extending from the first side wall to the second side wall and bordered by the first and second ends;
a first frame engaged with the first end to maintain the first end in a predetermined shape in both the collapsed state and the extended state;

a second frame engaged with the second end to maintain the second end in a predetermined shape in both the collapsed state and the extended state;

a first support member connected with a length of the first side wall extending from the first end toward the midpoint of the first side wall, the first support member extending less than half the distance between the first and second ends with envelope in the extended state, the first support member being pivotable relative to the first frame;

a second support member connected with a length of the first side wall extending from the second end toward the midpoint of the first side wall, the second support member extending less than half the distance between the first and second ends with envelope in the extended state, the second support member being pivotable relative to the first support member and the second frame;

a third support member connected with a length of the second side wall extending from the first end toward the midpoint of the second side wall, the third support member extending less than half the distance between the first and second ends with envelope in the extended state, the third support member being pivotable relative to the first frame;

a fourth support member connected with a length of the second side wall extending from the second end toward the midpoint of the second side wall, the fourth support member extending less than half the distance between the first and second ends with envelope in the extended state, the fourth support member being pivotable relative to the third support member and the second frame;

a first pocket connected with the length of the first side wall extending from the first end toward the midpoint of the first side wall, the first pocket receiving the first support member to connect the first support member to the first side wall;

a second pocket connected with the length of the first side wall extending from the second end toward the midpoint of the first side wall, the second pocket receiving the second support member to connect the second support member to the first side wall;

a third pocket connected with the length of the second side wall extending from the first end toward the midpoint of the second side wall, the third pocket receiving the third support member to connect the third support member to the second side wall;

a fourth pocket connected with the length of the second side wall extending from the second end toward the midpoint of the second side wall, the fourth pocket receiving the fourth support member to connect the fourth support member to the second side wall;

at least one first fastener engaged with the first frame to fix the collapsible container to the truck bed;

at least one second fastener engaged with the second end of the envelope and connectable with the truck bed to maintain the envelope in the extended state;

a flap pivotably connected with the second end of the envelope to pivot between an open position that allows access to the interior of the enclosure and a closed position wherein the flap is engaged with the outer perimeter of the second end to close the opening; and wherein in the extended state the envelope is supported by the first and second frames and the first, second, third and fourth support members to define the substantially box shaped enclosure, and in the collapsed state the envelope is folded with the first frame, the first, second, third and fourth support members, and the second frame arranged in a stacked relationship.

* * * * *